United States Patent
Itani et al.

(10) Patent No.: US 9,162,379 B2
(45) Date of Patent: Oct. 20, 2015

(54) RESIN ROTATING BODY AND MANUFACTURING METHOD FOR RESIN ROTATING BODY

(75) Inventors: Shizuo Itani, Toyota (JP); Shigeo Shinozaki, Toyota (JP)

(73) Assignee: NIPPON GASKET CO., LTD., Toyota-shi, Aichi (JP)

( * ) Notice: Subject to any disclaimer, the term of this patent is extended or adjusted under 35 U.S.C. 154(b) by 234 days.

(21) Appl. No.: 13/696,464

(22) PCT Filed: Apr. 6, 2011

(86) PCT No.: PCT/JP2011/058692
§ 371 (c)(1),
(2), (4) Date: Nov. 6, 2012

(87) PCT Pub. No.: WO2012/002014
PCT Pub. Date: Jan. 5, 2012

(65) Prior Publication Data
US 2013/0047767 A1 Feb. 28, 2013

(30) Foreign Application Priority Data
Jun. 28, 2010 (JP) .................. 2010-145895

(51) Int. Cl.
*F16H 55/12* (2006.01)
*B29C 43/02* (2006.01)
*B29C 43/18* (2006.01)
(Continued)

(52) U.S. Cl.
CPC ............ *B29C 43/027* (2013.01); *B29C 43/18* (2013.01); *F16H 55/06* (2013.01); *B29L 2015/003* (2013.01); *F16H 55/17* (2013.01); *F16H 2055/065* (2013.01); *Y10T 74/19893* (2015.01); *Y10T 156/108* (2015.01)

(58) Field of Classification Search
CPC ........ F16H 55/06; B29C 43/027; B29C 43/18
USPC ............................ 74/434, 439, 446, 445, 458
See application file for complete search history.

(56) References Cited

U.S. PATENT DOCUMENTS 153,630 A * 7/1874 Sweeney .................. 74/446
1,223,348 A * 4/1917 Bastian .................. 156/256
(Continued)

FOREIGN PATENT DOCUMENTS

JP 04-008956 1/1992
JP 11-227061 8/1999
(Continued)

OTHER PUBLICATIONS

International Search Report of PCT/JP2011/058692 (2 pgs.).

*Primary Examiner* — Justin Krause
(74) *Attorney, Agent, or Firm* — Flynn, Thiel, Boutell & Tanis, P.C.

(57) ABSTRACT

A resin rotating body 1 is configured by a ring-shaped resin ring 2, and a metallic bush 3 which is fitted to an inner circumferential surface 2a of the resin ring, and projections 3a as rotation preventing means that connects the resin ring and the metallic bush so that the resin ring and the metallic bush do not rotate with respect to each other are provided on an outer circumferential surface of the metallic bush. Projections of the metallic bush are further provided at positions eccentric forward in a press-fitting direction of the metallic bush from a center in the axial direction of the metallic bush.

2 Claims, 3 Drawing Sheets

(51) Int. Cl.
*F16H 55/06* (2006.01)
*B29L 15/00* (2006.01)
*F16H 55/17* (2006.01)

(56) References Cited

U.S. PATENT DOCUMENTS

| | | | |
|---|---|---|---|
| 1,421,231 A * | 6/1922 | Henninger | 74/446 |
| 1,466,236 A * | 8/1923 | Kinney | 74/445 |
| 1,655,278 A * | 1/1928 | Mansur | 74/446 |
| 3,530,735 A * | 9/1970 | Allen | 74/446 |
| 6,591,708 B2 * | 7/2003 | Kobayashi et al. | 74/446 |

FOREIGN PATENT DOCUMENTS

| | | |
|---|---|---|
| JP | 2001-295913 | 10/2001 |
| JP | 2005-140140 | 6/2005 |
| JP | 3980239 | 7/2007 |
| JP | 2009-154338 | 7/2009 |
| JP | 2009-250364 | 10/2009 |
| JP | 2010-115853 | 5/2010 |

* cited by examiner

PRESS-FITTING DIRECTION

RESIN ROTATING BODY AND MANUFACTURING METHOD FOR RESIN ROTATING BODY

TECHNICAL FIELD

The present invention relates to a resin rotating body and a manufacturing method for the resin rotating body, and more particularly to a resin rotating body in which a rotation preventing means that connects a resin ring and a metallic bush so that the resin ring and the metallic bush do not rotate with respect to each other is provided on an outer circumferential surface of the metallic bush, and a manufacturing method for the resin rotating body.

BACKGROUND ART

Conventionally, resin rotating bodies are known, which are each configured by a ring-shaped resin ring and a metallic bush which is fitted to an inner circumferential surface of the above described resin ring, wherein rotation preventing means that connects the resin ring and the metallic bush so that the resin ring and the metallic bush do not rotate with respect to each other is provided on the outer circumferential surface of the above described metallic bush (Patent Literatures 1 to 4).

Among them, each of the manufacturing methods for the resin rotating bodies according to Patent Literatures 1 and 2 disposes a metallic bush inside a molding die, disposes two ring-shaped reinforcing fibers to sandwich rotation preventing means of the above described metallic bush from both sides in the axial direction, impregnates the reinforcing fibers with a resin while pressing the reinforcing fibers from both sides in the axial direction, and molds the above described resin ring.

Further, each of the manufacturing methods for the resin rotating bodies according to Patent Literatures 3 and 4 stacks reinforcing fibers to be thicker than the thickness in the axial direction of the above described metallic bush in a state in which the above described metallic bush is installed inside the molding die, impregnates the reinforcing fibers with a resin while pressing the reinforcing resins from both sides in the axial direction, and molds the above described resin ring.

PRIOR ART DOCUMENTS

Patent Literature

Patent Literature 1: Japanese Patent No. 3980239
Patent Literature 2: Japanese Patent Laid-Open No. 2001-295913
Patent Literature 3: Japanese Patent Laid-Open No. 2009-154338
Patent Literature 4: Japanese Patent Laid-Open No. 2009-250364

SUMMARY OF INVENTION

Problems to be Solved by the Invention

However, in the case of each of Patent Literatures 1 to 4, the metallic bush and the fibers are disposed inside the molding die, and the above described fibers have to be impregnated with a resin. Therefore, there arise the problems of complicating the structure of the molding die, and complicating the process steps.

In view of the problems as above, the present invention provides a resin rotating body which can be manufactured by simple process steps, and hardly causes removal of the resin ring and the metallic bush from each other, and a manufacturing method for the resin rotating body.

Means for Solving the Problems

Namely, a resin rotating body according to the invention (1) is configured by a ring-shaped resin ring, and a metallic bush which is fitted to an inner circumferential surface of the resin ring,
in which a rotation preventing means that connects the resin ring and the metallic bush so that the resin ring and the metallic bush do not rotate with respect to each other is provided on an outer circumferential surface of the metallic bush,
wherein the resin ring is molded by heating and compressing an element body in which a plurality of sheet-shaped resins manufactured by sheet making are stacked in layers in an axial direction and a diameter of the inner circumferential surface is formed to be substantially the same diameter as the outer circumferential surface of the metallic bush,
the metallic bush is integrally connected to the resin ring by being press-fitted to the inner circumferential surface of the element body along the axial direction, and
the rotation preventing means of the metallic bush is further provided at a position eccentric forward in a press-fitting direction of the metallic bush from a center in the axial direction of the metallic bush.

Namely, a manufacturing method for a resin rotating body according to the invention is a manufacturing method for a resin rotating body that fits a metallic bush to an inner circumferential surface of a resin ring having a ring shape, and connects the resin ring and the metallic bush at this time by rotation preventing means provided on the outer circumferential surface of the metallic bush so that the resin ring and the metallic bush do not rotate with respect to each other,
wherein an element body, in which a plurality of sheet-shaped resins manufactured by sheet making are stacked in layers in an axial direction and a diameter of the inner circumferential surface is formed to be substantially the same diameter as the outer circumferential surface of the metallic bush, is formed, and the rotation preventing means of the metallic bush is provided at a position eccentric to one end surface from a center in an axial direction of the metallic bush,
the element body is heated and compressed to mold the resin ring, and the metallic bush is press-fitted to the inner circumferential surface of the element body along the axial direction to integrally connect the metallic bush to the resin ring, and
further, when the metallic bush is press-fitted in the element body, the rotation preventing means is located at a front side in the press-fitting direction of the metallic bush.

Advantageous Effects of Invention

According to the above described inventions, the element body in which a plurality of sheet-shaped resins manufactured by sheet making are stacked in layers in the axial direction is molded, and the metallic bush is press-fitted to the inner circumferential surface of the element body. Therefore, it is not necessary to impregnate the fibers which are housed in the molding die for manufacture with a resin, and the resin rotating body can be easily manufactured.

Further, according to the above described inventions, the above described rotation preventing means of the metallic bush is located at the position which is eccentric to one end surface from the center in the axial direction of the metallic bush, and the rotation preventing means is located at the front side in the press-fitting direction of the metallic bush when the above described metallic bush is press-fitted to the element body.

As a result, as is also obvious from the experimental result which will be described later, even when the load acts on the metallic bush in the opposite direction from the press-fitting direction, the metallic bush can be made difficult to remove from the resin ring.

MODE FOR CARRYING OUT THE INVENTION

Figure 1:
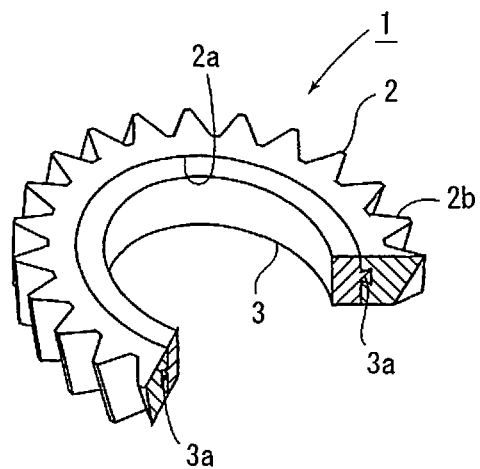
FIG. 1 is a perspective view of a resin gear according to the present embodiment.
Figure 2:
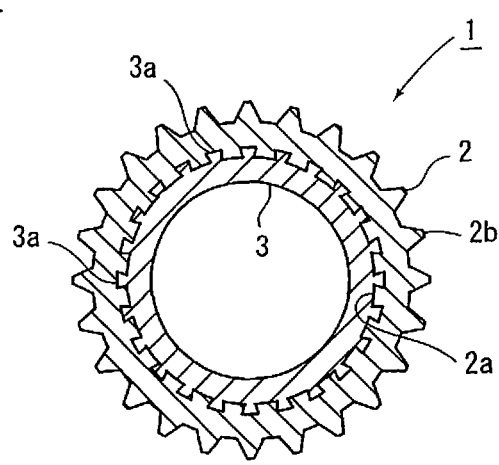
FIG. 2 is a sectional view in a circumferential direction of the resin gear.
Figure 3:
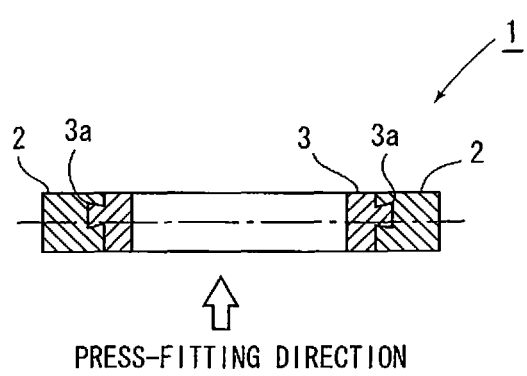
FIG. 3 is a sectional view in an axial direction of the resin gear.

Hereinafter, explaining an illustrated embodiment, FIG. 1 to FIG. 3 show a resin rotating body 1 for used in a balance shaft gear or the like of an engine. FIG. 1 shows a perspective view of the resin rotating body 1, FIG. 2 shows a sectional view in a circumferential direction cut along a plane orthogonal to a center axis of the resin rotating body 1, and FIG. 3 shows a sectional view in an axial direction cut along a plane parallel with the axial direction, respectively.

The above described resin rotating body 1 is configured by a ring-shaped resin ring 2, and a metallic bush 3 fitted to an inner circumferential surface 2a of the above described resin ring 2, helical teeth 2b which are formed to be inclined with respect to an axial direction are formed equidistantly on an outer periphery of the above described resin ring 2, and the above described rotating body 1 configures a helical gear.

The above described ring 2 is made by molding an element body 4 by stacking a plurality of sheet-shaped resins S, which are made by sheet making of predetermined fibers with phenol resin powder being distributed, in layer in an axial direction, and thereafter, compression-molding the element body 4 while heating the element body 4, though the details will be described later.

The above described metallic bush 3 is made of a sintered alloy, and carbon steel. Projections 3a as rotation preventing means are formed on an outer circumferential surface of the metallic bush 3 as shown in FIG. 2, and the above described resin ring 2 surrounds the respective projections 3a, whereby the above described resin ring 2 and the metallic bush 3 are connected so as not to rotate with respect to each other.

The above described projections 3a are provided in a row radially along the outer circumferential surface of the metallic bush 3, and are formed in a reverse taper shape which becomes wider toward an outer side from the outer circumferential surface of the metallic bush 3. The projections 3a of the present embodiment are provided at positions eccentric to one end surface of the metallic bush 3 with respect to the center in the axial direction of the metallic bush 3.

Figure 4:
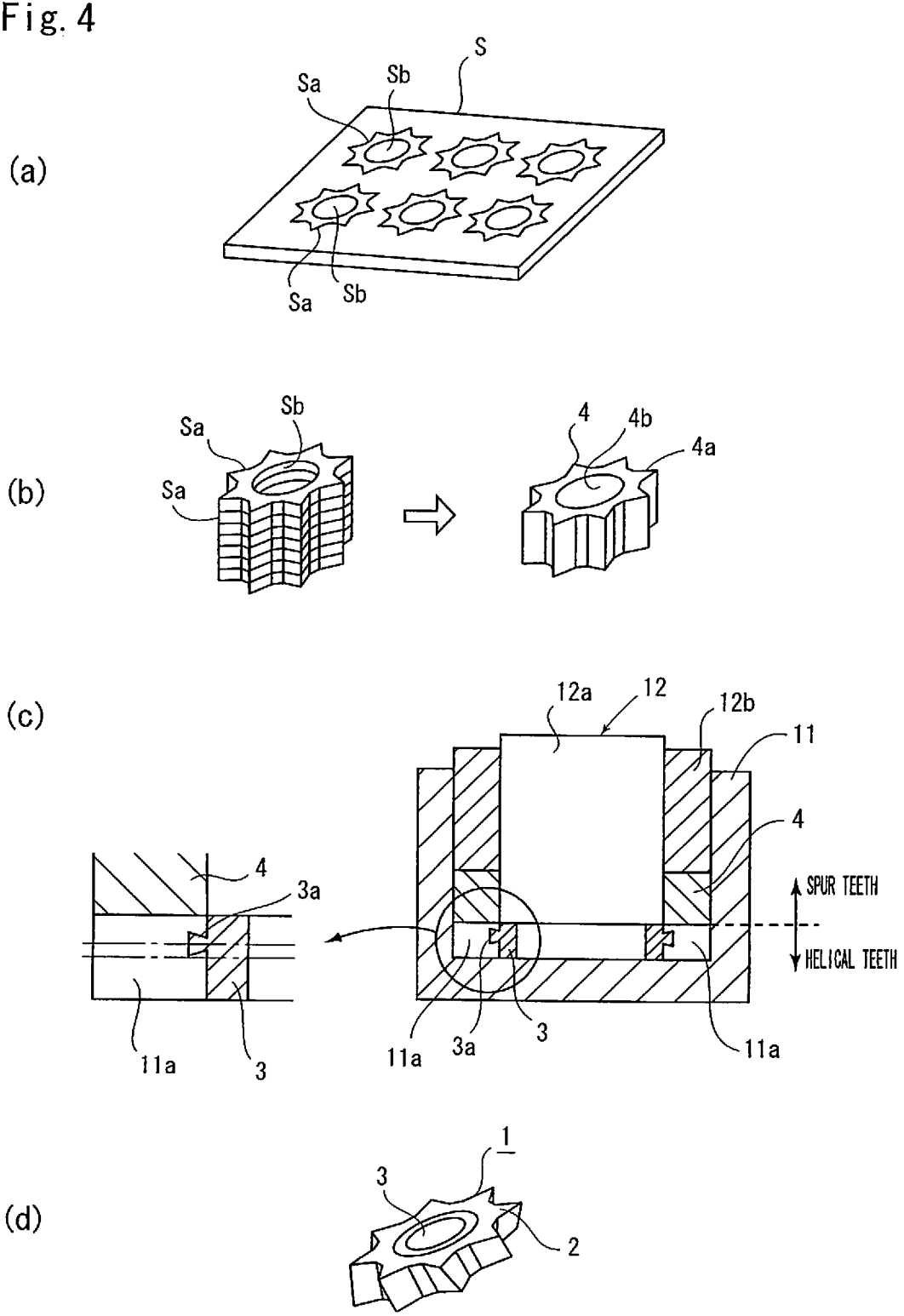
FIG. 4 is a view explaining a manufacturing method for the resin gear.

Next, a manufacturing method for the above described resin rotating body 1 will be described with use of FIG. 4.

First of all, FIG. 4(a) shows a process step of manufacturing the sheet-shaped resin S by sheet making, and cutting the sheet-shaped resin S into gear shapes.

First, phenol resin powder, para-aramid fiber, and metha-aramid fiber are dispersed in water at predetermined ratios respectively, and this is subjected to sheet making, whereby the rectangular sheet-shaped resin S is manufactured, and the sheet-shaped resin S is put into a pressurizing pressing machine to perform dehydration.

From the sheet-shaped resin S obtained here, a plurality of gear shapes can be obtained, and the above described rectangular sheet-shaped resin S is put into a punch press machine, whereby a plurality of sheet-shaped resins Sa in gear shapes can be obtained, and at this time, a circular hole Sb which configures the above described inner circumferential surface 2a is provided by perforating in each of the sheet-shaped resins Sa.

The residual material which occurs at this time can be used by being recycled when the above described sheet-shaped resin S is made again by sheet making.

Thereafter, from the above described sheet-shaped resin Sa in the gear shape which is obtained, water is removed by means such as drying.

Next, FIG. 4(b) shows a process step of molding the above described element body 4 by stacking a plurality of the above described sheet-shaped resins S in the gear shapes in layer.

In the present embodiment, eight sheet-shaped resins S are stacked in layers, and at this time, after the sheet-shaped resins S are stacked in layers in the state in which the positions of the teeth in the respective sheet-shaped resins S correspond to one another, the stacked sheet-shaped resins S are compressed in the axial direction, that is, a stacking direction while the stacked sheet-shaped resins S are heated and dried at a predetermined temperature.

Thereupon, the phenol which is contained in the above described sheet-shaped resins S is softened, and the adjacent sheet-shaped resins S are bonded to each other, as a result of which, the element body 4 with spur teeth 4a being formed on an outer periphery and a circular inner circumferential surface 4b being formed is obtained.

In the element body 4, a thickness in the axial direction is formed to be larger than a thickness in the axial direction of the above described metallic bush 3, but a dimension in a diameter direction hardly differs from the resin rotating body 1 after molded, and in particular, a diameter of the above described inner circumferential surface 2a is the same diameter as the outer circumferential surface of the above described metallic bush 3.

FIG. 4(c) shows a process step of press-fitting the above described element body 4 onto the metallic bush 3 while heating and pressing the element body 4, and connecting the resin ring 2 and the metallic bush 3.

For the process step, a molding die is used, and the molding die includes a lower die 11 which houses the metallic bush 2 and the element body 4, an upper die 12 which presses the above described element body 4 from above, and a heater not illustrated for heating the above described element body 4.

The metallic bush 3 is fixed to a lower portion center of the lower die 11, a molding space 11a in which the element body 4 flows and is formed into a helical gear by pressurizing is formed around the metallic bush 3, and a guide portion which houses the above described element body 4 in the spur gear shape is formed in a position adjacent to a top side of the molding space 11a.

The upper die 12 includes holding means 12a which sandwiches the above described metallic bush 3 between the upper die 12 and the lower die 11, and pressing means 12b which presses the element body 4 in the axial direction, and the above described pressing means 12b is formed into the shape of a spur gear in accordance with the shape of the guide portion of the above described lower die 11.

By the configuration as above, after the above described metallic bush 3 is placed in the above described lower die 11, and the element body 4 is housed in the guide of the above described lower die 11, the element body 4 is heated to a predetermined temperature by the above described heater, and thereafter, the above described pressing means 12b is lowered.

At this time, the phenol which is contained in the element body 4 is temporarily softened by heating, and the above described pressing means 12b presses the element body 4 downward, whereby the spur teeth 4a which are formed on the outer circumferential surface of the element body 4 are molded to be helical teeth while the spur teeth 4a are forced into the molding space 11a of the above described lower die 11.

Meanwhile, the metallic bush 3 is press-fitted to the inner circumferential surface 2a of the element body 4 from below the element body 4, the projections 3a which are formed at the metallic bush 3 push aside the resin of the element body 4 which is softened at this time, and the resin enters the space which is formed after the projections 3a pass.

Thereafter, the resin of the element body 4 which is filled in the lower die 11 is solidified by a crosslinking reaction, and thereafter, the resin rotating body 1 with the resin ring 2 and the metallic bush 3 connected to each other is taken out from the lower die 11.

Subsequently, in FIG. 4 (d), annealing is performed by heating the resin rotating body 1, which is obtained by the above described process step, again, and finishing such as deburring is performed, whereby the above described resin rotating body 1 is obtained.

According to the manufacturing method for the resin rotating body 1 in the present embodiment, the element body 4 in the shape of the spur gear is molded by stacking a plurality of the sheet-shaped resins Sa in the gear shapes which are manufactured by sheet making, in layers in the axial direction, and the diameter of the inner circumferential surface 2a of the element body 4 is formed to be substantially the same diameter as the outer circumferential surface of the above described metallic bush 3. Therefore, the metallic bush 3 is press-fitted to the inner circumferential surface 2a of the above described element body 4 along the axial direction thereafter, whereby the metallic bush 3 can be integrally connected to the resin ring 2.

Namely, it is not necessary to house the metallic bush 3 and fibers inside the molding die for manufacture and press the metallic bush 3 and the fibers while impregnating the above described fibers with a resin, as in Patent Literatures 1 to 4, and therefore, the resin rotating body 1 can be manufactured efficiently without the device being complicated.

Further, the above described element body 4 is formed into the shape of a spur gear, and is heated and pressurized to be formed into the shape of a helical gear, and therefore, it is not necessary to manufacture the disk-shaped resin rotating body 1 and cut teeth on the outer circumferential surface as in the conventional resin rotating body, whereby the method of the present invention is efficient and can suppress occurrence of the residual material.

Furthermore, according to the manufacturing method for the resin rotating body 1 in the present embodiment, as shown in the enlarged view of the above described FIG. 4(c), in the process step of press-fitting the metallic bush 3 in the element body 4, the above described metallic bush 3 is installed so that the above described projections 3a are located at positions eccentric forward in the press-fitting direction of the metallic bush 3 from the center in the axial direction.

In the present embodiment, the metallic bush 3 is press-fitted relatively from below the element body 4 to above, and therefore, the above described projections 3a are located to be eccentrically forward in the press-fitting direction, that is, to an upper side of the metallic bush 3.

By installing the metallic bush 3 as above, when the above described element body 4 is press-fitted onto the metallic bush 3, and the above described resin ring 2 and the metallic bush 3 are connected, engaging amounts of the above described projections 3a into the resin ring 2 in the front side in the press-fitting direction and the rear side in the press-fitting direction differ from each other.

As a result, as shown in the following experimental result, the metallic bush 3 can be made difficult to remove from the resin ring 2, even if the load is caused to act on the metallic bush 3 in the opposite direction from the press-fitting direction.

Hereinafter, the experimental result on the resin rotating body 1 which is manufactured by the above described manufacturing method will be described with use of FIG. 5 and FIG. 6.

Figure 5:
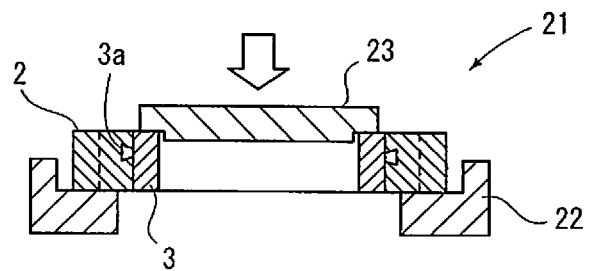
FIG. 5 is a view showing a configuration of an experimental device for use in an experiment.

As shown in FIG. 5, an experimental device 21 used in the present experiment is configured by support means 22 which supports the resin ring 2 portion in the above described resin rotating body 1 from below, and pressing means 23 which presses the above described metallic bush 3 downward in the axial direction by an end surface thereof, and presses the metallic bush 3 downward by the above described pressing means 23 to measure the load (bonding strength) at the time of the metallic bush 3 removal from the resin ring 2.

In the present experiment, the metallic bush 3 with a thickness of 11 mm was used, and the experiment was performed on three kinds of resin rotating bodies 1 that were the conventional product with the above described projections 3a being located in the center in the axial direction, invention product 1 with the projections 3a being eccentric by 1 mm with respect to the center in the axial direction, and invention product 2 with the projections 3a being eccentric by 1.5 mm with respect to the center in the axial direction.

Subsequently, the respective three kinds of resin rotating bodies 1 were placed on the above described support means in the respective states that were a state in which an end surface at a front side in the press-fitting direction of the metallic bush 3 faced upward (upward direction), and a state in which the end surface at the front side in the press-fitting direction faced downward (downward direction), and measurement of the bonding strength was performed for the respective states.

In other words, in the above described invention product 1 and invention product 2, the case in which the metallic bush 3 is placed in the upward direction indicates the state in which the above described projections 3a are located at an upper side from the center in the axial direction of the metallic bush 3, and the case in which the metallic bush 3 is placed in the downward direction indicates the state in which the above described projections 3a are located at a lower side from the center in the axial direction of the metallic bush 3.

Figure 6:
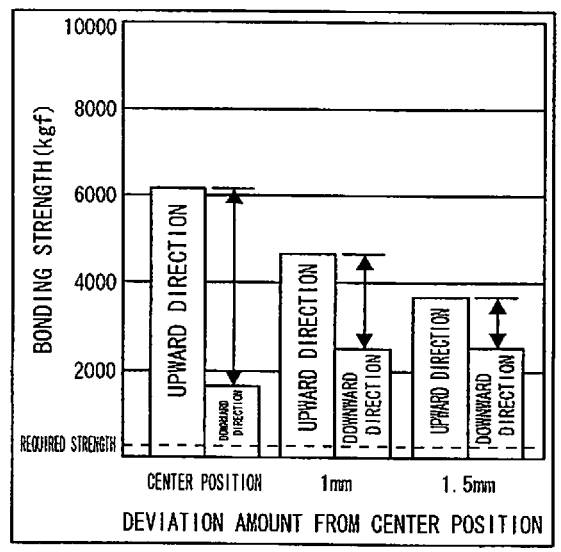
FIG. 6 is a graph showing the experimental result.

As shown in FIG. 6, in all of the conventional product, invention product 1 and invention product 2, the bonding strength in the case of the metallic bush 3 being placed in the upward direction is higher than the bonding strength in the case of the metallic bush 3 being placed in the downward direction.

Meanwhile, when the bonding strengths in the case of being placed in the downward direction are compared, the bonding strengths of invention products 1 and 2 are higher as compared with the conventional product, and it is understandable that the conventional product has unevenness in the bonding strength.

As above, by manufacturing the resin rotating body 1 by the above described manufacturing method, the resin rotating body 1 can be obtained, in which the metallic bush 3 hardly removes from the resin ring 2 with respect to the load from either the front or the rear direction to the press-fitting direction of the metallic bush 3.

Such a phenomenon is supposed to be due to the fact that if the above described projections 3*a* push aside the resin when the metallic bush 3 is press-fitted in the above described element body 4, the resin enters behind the projections 3*a* which passes, but the densities of the resin and the fibers which flow differ in the front side and the rear side in the press-fitting direction of the projections 3*a*, and therefore, the bonding strength changes in accordance with the pressing directions as described above.

Therefore, by disposing the above described projections 3*a* at the front side in the press-fitting direction from the center in the axial direction of the metallic bush 3 as in the present embodiment, more resin is allowed to enter the rear side in the press-fitting direction from the projections 3*a*, and the resin rotating body 1, in which the bonding strength in the case where the load in the opposite direction from the press-fitting direction acts on the metallic bush 3 is increased, can be obtained.

Note that the rotation preventing means in the above described embodiment is the projections which are formed equidistantly on the outer circumferential surface of the metallic bush, but may be an annular projection which surrounds the outer circumferential surface of the metallic bush 2, as the rotation preventing means described in the above described Patent Literature 1, for example.

Further, as the rotation preventing means, a recessed portion may be formed on the outer circumferential surface of the metallic bush, the recessed portion may be filled with a resin, and the resin ring and the metallic bush may be connected. In this case, the above described recessed portion can be also formed at the front side in the press-fitting direction with respect to the center in the axial direction.

REFERENCE SIGNS LIST

1 rein rotating body
2 resin ring
2*a* inner circumferential surface
3 metallic bush
3*a* projection
4 element body

The invention claimed is:

1. A resin rotating body comprising a resin ring and a metallic bush which is fitted to an inner circumferential surface of the resin ring and rotation preventing means for connecting the resin ring and the metallic bush and preventing relative rotation between the resin ring and the metallic bush provided on an outer circumferential surface of the metallic bush, wherein the resin ring is molded by heating and compressing an element body in which a plurality of sheet-shaped resins manufactured by sheet making are stacked in layers in an axial direction and a diameter of the inner circumferential surface is formed to be substantially the same diameter as the outer circumferential surface of the metallic bush, the metallic bush is integrally connected to the resin ring by being press-fitted to the inner circumferential surface of the element body along the axial direction, and the rotation preventing means is a plurality of projections which are provided radially along the outer circumferential surface of the metallic bush, the plurality of projections are provided only at a position eccentric in the axial direction from a center in the axial direction of the metallic bush, the projections are each formed into a reverse taper shape which is wider toward an outside from the outer circumferential surface of the metallic bush and the plurality of projections are provided in a row on the outer circumferential surface of the metallic bush along a circumferential direction and a cross-sectional shape of each protrusion along the axial direction and a cross-sectional shape of each protrusion in a direction orthogonal to the axial direction are a reverse taper shape.

2. The resin rotating body according to claim 1,
wherein helical teeth are formed equidistantly on the outer circumferential surface of the resin ring and the resin rotating body is a helical gear.

* * * * *